US008834831B2

(12) United States Patent
Stote, II et al.

(10) Patent No.: US 8,834,831 B2
(45) Date of Patent: Sep. 16, 2014

(54) CONTROLLING MORPHOLOY OF TITANIUM OXIDE USING DESIGNED PEPTIDES

(75) Inventors: Robert E. Stote, II, Pepperell, MA (US); Shaun F. Filocamo, Blackstone, MA (US)

(73) Assignee: The United States of America as Represented by the Secretary of the Army, Washington, DC (US)

(*) Notice: Subject to any disclaimer, the term of this patent is extended or adjusted under 35 U.S.C. 154(b) by 616 days.

(21) Appl. No.: 13/004,050

(22) Filed: Jan. 11, 2011

(65) Prior Publication Data
US 2012/0189535 A1 Jul. 26, 2012

(51) Int. Cl.
*C01G 23/047* (2006.01)
*C01G 23/053* (2006.01)

(52) U.S. Cl.
CPC .......... *C01G 23/053* (2013.01); *C01P 2004/30* (2013.01); *C01P 2004/03* (2013.01); *C01P 2004/32* (2013.01)
USPC ....................................... 423/610

(58) Field of Classification Search
CPC .. C01G 23/043; C01G 23/047; C01G 23/053; C01P 2004/32; C01P 2004/30; C01P 2004/03
USPC .................................. 423/608–612
See application file for complete search history.

(56) References Cited

U.S. PATENT DOCUMENTS

| 4,803,064 | A | 2/1989 | Montino et al. |
| 4,923,682 | A | 5/1990 | Roberts et al. |
| 6,004,444 | A | 12/1999 | Aksay et al. |
| 6,228,248 | B1 | 5/2001 | Aksay et al. |
| 7,179,356 | B2 | 2/2007 | Aksay et al. |
| 7,335,717 | B2 | 2/2008 | Morse et al. |
| 7,361,731 | B2 | 4/2008 | McAuliffe et al. |
| 7,776,760 | B2 | 8/2010 | Taylor |
| 7,785,922 | B2 | 8/2010 | Robbins |

(Continued)

FOREIGN PATENT DOCUMENTS

| WO | WO 03/078451 A2 | 9/2003 |
| WO | WO 2005/037856 A2 | 4/2005 |
| WO | WO 2006/048030 A1 | 5/2006 |

OTHER PUBLICATIONS

Chen et al., "Development of Macroporous Titania Monoliths Using a Biocompatible Method. Part 1: Material Fabrication and Characterization," Chem. Mater., 18(2):5326-35 (2006).

(Continued)

*Primary Examiner* — Anthony J Zimmer
(74) *Attorney, Agent, or Firm* — Roger C. Phillips

(57) ABSTRACT

A method for biomimetically preparing titanium oxide precipitates with specific morphologies. According to one embodiment, designed peptides that are 5-20 amino acids long are used as initiators to cause the precipitation of titanium oxide from a buffered aqueous solution containing a titanium oxide precursor, such as titanium(IV) bis(ammonium lactate) dihydroxide. The peptides consist of amino acids that are hydrophilic at neutral pH, such as serine, and amino acids that are cationic at neutral pH, such as lysine and arginine. The peptides sequences are designed to induce the formation of specific morphologies including, but not limited to, spheres, rectangular blocks, cubes, porous sheets, nonporous sheets, and flowers. The method enables the formation of distinct and consistent titanium oxide morphologies without a need for high temperatures and pressures or for caustic reaction conditions. This, in turn, allows for oxide formation in the presence of environmentally sensitive materials and limits hazardous waste streams.

24 Claims, 4 Drawing Sheets

(56) References Cited

U.S. PATENT DOCUMENTS

| | | |
|---|---|---|
| 2003/0068900 A1 | 4/2003 | Belcher et al. |
| 2005/0164515 A9 | 7/2005 | Belcher et al. |
| 2006/0121346 A1 | 6/2006 | Nam et al. |
| 2007/0112548 A1 | 5/2007 | Dickerson et al. |
| 2008/0213663 A1 | 9/2008 | Hu et al. |

OTHER PUBLICATIONS

Yi et al., "Development of Macroporous Titania Monoliths by a Biocompatible Method. Part 2: Enzyme Entrapment Studies," Chem. Mater., 18(2):5336-42 (2006).
Limmer et al., "Template-Based Growth of Various Oxide Nanorods by Sol-Gel Electrophoresis," Adv. Funct. Mater., 12(1):59-64 (2002).
Imhof, Preparation and Characterization of Titania-Coated Polystyrene Spheres and Hollow Titania Shells, Langmuir, 17:3579-85 (2001).
Li et al., "Facile Fabrication of Hollow Silica and Titania Microspheres Using Plasma-Treated Polystyrene Spheres as Sacrificial Templates," Langmuir, 24(19):10552-6 (2008).
Cha et al., "Biomimetic synthesis of ordered silica structures mediated by block copolypeptides," Nature, 403:289-292 (2000).
Sumper et al., "Silica formation in diatoms: the function of long-chain polyamines and silaffins," J. Mater. Chem., 14:2059-65 (2004).
Zhang et al., "Biomimetic zinc oxide replica with structural color using butterfly (*Ideopsis similis*) wings as templates," Bioinsp. Biomim., 1:89-95 (2006).
Sewell et al., "Biomimetic Synthesis of Titanium Dioxide Utilizing the R5 Peptide Derived from *Cylindrotheca fusiformis*," Chem. Mater., 18:3108-13 (2006).
Gorna et al., "Bioinspired Mineralization of Inorganics from Aqueous Media Controlled by Synthetic Polymers," Macromol. Biosci., 7(2):163-73 (2007).
Dickerson et al., "Identification and Design of Peptides for the Rapid, High-Yield Formation of Nanoparticulate TiO2 from Aqueous Solutions at Room Temperature," Chem. Mater., 20(4):1578-84 (2008).
Beier et al., "Room-Temperature Synthetic Pathways to Barium Titanate Nanocrystals," Small, 4(12):2102-6 (2008).
Durupthy et al., "Bioinspired Synthesis of Crystalline TiO2: Effect of Amino Acids on Nanoparticles Structure and Shape," Crystal Growth and Design, 7(12):2696-704 (2007).
Mantion et al., "Amino Acids in Iron Oxide Mineralization: (Incomplete) Crystal Phase Selection is Achieved Even with Single Amino Acids," The Journal of Physical Chemistry C, 112(32):12104-110 (2008).
Jiang et al., "Biomimetic synthesis of titania nanoparticles induced by protamine," Dalton Trans., 4165-71 (2008).
Kroeger et al., "Bioenabled Synthesis of Rutile (TiO2) at Ambient Temperature and Neutral pH," Angew. Chem. Int. Ed., 45:7239-43 (2006).
Kroeger et al., "Polycationic Peptides from Diatom Biosilica That Direct Silica Nanosphere Formation," Science, 286:1129-32 (1999).
Belton et al., "Towards an understanding of (bio)silification: the role of amino acids and lysine oligomers in silification," J. Mater. Chem., 14:2231-41 (2004).
Malfatti et al., "Mesostructured and self-assembled titania films for photovoltaic applications," Microporous and Mesoporous Materials, 88:304-11 (2006).
Patwardhan et al., "Conformation and Assembly of Polypeptide Scaffolds in Templating the Synthesis of Silica: An Example of a Polylysine Macromolecular 'Switch'," Biomacromolecules, 7:491-7 (2006).
Patwardhan et al., "Bioinspired synthesis of new silica structures," Chem. Commun., 1122-3 (2003).
Adamson et al., "Non-Peptide Polymeric Silicatein alpha Mimic for Neutral pH Catalysis in the Formation of Silica," Macromolecules, 40:5710-7 (2007).
Sewell et al., "Versatile biomimetic dendrimer templates used in the formation of TiO2 and GeO2," Dalton Trans., 3857-65 (2008).
Sumerel et al., "Biocatalytically Templated Synthesis of Titanium Dioxide," Chem. Mater., 15:4804-9 (2003).
Taubert et al., "Kinetics and Particle Formation Mechanism of Zinc Oxide Particles in Polymer-Controlled Precipitation from Aqueous Solution," Langmuir, 18:4488-94 (2002).
Tomczak et al., "Polypeptide-Templated Synthesis of Hexagonal Silica Platelets," J. Am. Chem. Soc., 127:12577-82 (2005).
Tomczak et al., "Morphological control and assembly of zinc oxide using a biotemplate," Acta Biomaterialia, 5:876-82 (2009).
Yang et al., "Solvothermal Synthesis and Photoreactivity of Anatase TiO Nanosheets with Dominant {001} Facets," J. Am. Chem. Soc., 131(11):4078-83 (2009).
Tan et al., "Uncovering the Design Rules for Peptide Synthesis of Metal Nanoparticles," J. Am. Chem. Soc., 132:5677-86 (2010).

SEQUENCE LISTING

```
<160> NUMBER OF SEQ ID NOS: 20

<210> SEQ ID NO 1
<211> LENGTH: 5
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 1

Lys Ser Ser Lys Lys
1               5

<210> SEQ ID NO 2
<211> LENGTH: 12
<212> TYPE: PRT
<213> ORGANISM: Artificial Sequence
```

```
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 2

Ser Lys Ser Lys Lys Lys Ser Lys Ser Lys Lys Lys
1               5                   10

<210> SEQ ID NO 3
<211> LENGTH: 11
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 3

Ser Lys Lys Lys Lys Lys Lys Lys Lys Lys Ser
1               5                   10

<210> SEQ ID NO 4
<211> LENGTH: 11
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 4

Ser Ser Lys Lys Lys Lys Lys Lys Lys Lys Lys
1               5                   10

<210> SEQ ID NO 5
<211> LENGTH: 11
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 5

Ser Lys Ser Lys Lys Lys Lys Lys Lys Lys Lys
1               5                   10

<210> SEQ ID NO 6
<211> LENGTH: 12
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 6

Ser Lys Lys Lys Lys Ser Ser Lys Lys Lys Lys Ser
1               5                   10

<210> SEQ ID NO 7
<211> LENGTH: 9
<212> TYPE: PRT
```

```
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 7

Lys Lys Lys Ser Lys Ser Lys Lys Lys
1               5

<210> SEQ ID NO 8
<211> LENGTH: 11
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 8

Ser Lys Lys Lys Lys Lys Ser Lys Lys Lys Lys
1               5                   10

<210> SEQ ID NO 9
<211> LENGTH: 12
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 9

Ser Lys Lys Lys Lys Lys Ser Lys Lys Lys Lys
1               5                   10

<210> SEQ ID NO 10
<211> LENGTH: 11
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 10

Ser Lys Lys Ser Lys Lys Lys Lys Lys Lys
1               5                   10

<210> SEQ ID NO 11
<211> LENGTH: 13
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 11

Arg Arg Arg Ser Ser Arg Arg Arg Ser Ser Arg Arg Arg
1               5                   10

<210> SEQ ID NO 12
<211> LENGTH: 15
```

```
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 12

Ser Lys Ser Lys Lys Lys Ser Lys Ser Lys Lys Lys Ser Lys Ser
1               5                   10                  15

<210> SEQ ID NO 13
<211> LENGTH: 10
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 13

Ser Ser Lys Lys Lys Ser Ser Lys Lys Lys
1               5                   10

<210> SEQ ID NO 14
<211> LENGTH: 12
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 14

Arg Arg Ser Ser Ser Arg Arg Ser Ser Ser Arg Arg
1               5                   10

<210> SEQ ID NO 15
<211> LENGTH: 15
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 15

Arg Arg Arg Ser Arg Arg Arg Ser Arg Arg Arg Ser Arg Arg Arg
1               5                   10                  15

<210> SEQ ID NO 16
<211> LENGTH: 7
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 16

Ser Lys Lys Ser Lys Lys Lys
1               5

<210> SEQ ID NO 17
```

```
<211> LENGTH: 14
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 17

Lys Lys Ser Ser Lys Lys Lys Lys Lys Lys Lys Lys Lys Ser
1               5                   10

<210> SEQ ID NO 18
<211> LENGTH: 10
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 18

Lys Lys Lys Lys Ser Ser Lys Lys Lys Lys
1               5                   10

<210> SEQ ID NO 19
<211> LENGTH: 13
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 19

Ser Lys Lys Ser Lys Lys Lys Lys Lys Lys Lys Lys Lys
1               5                   10

<210> SEQ ID NO 20
<211> LENGTH: 9
<212> TYPE: PRT
<213> ORGANISM: Artificial Sequence
<220> FEATURE:
<221> NAME/KEY:
<223> OTHER INFORMATION: combination of hydrophilic and cationic amino
      acids at neutral pH to induce formation of titanium oxide
      precipitate of specific morphology

<400> SEQUENCE: 20

Ser Lys Lys Lys Ser Lys Lys Lys Lys
1               5
```

US 8,834,831 B2

CONTROLLING MORPHOLOY OF TITANIUM OXIDE USING DESIGNED PEPTIDES

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

The present invention relates generally to methods for preparing inorganic oxides and relates more particularly to a method for preparing titanium oxide precipitates of desired morphologies.

Inorganic oxides are currently being used in a number of diverse commercial and military applications, such as in the fields of photovoltaics, photocatalysis, enzyme support, energy storage, sensors, pigments, and photonics. By way of example, one type of recently developed photovoltaic system utilizes photosensitive dyes on the surfaces of titanium oxide (i.e., titania) films. As another example, metal oxides have found use as sensors, where the sensing agent is entrapped within a metal oxide matrix (see, for example, Chen et al., Chem. Mater., 18(2): 5326-35 (2006), which is incorporated herein by reference). As yet another example, metal oxides have found use in military settings for laser eye protection and shielding. As a further example, some metal oxides, such as aluminum oxide and titanium oxide, have been used to decontaminate hazardous chemicals in applications ranging from water purification to protection against chemical warfare agents.

For many of the above-described applications, the morphology of the inorganic oxide material may have some bearing on its usefulness for its intended purpose. For example, in the case of titanium oxide in photovoltaics, it has been found that titanium oxide nanorods, with their greater surface areas, give greater energy yields than bulk titanium oxide films (see, for example, Limmer et al., Adv. Funct. Mater., 12(1):59-64 (2002), which is incorporated herein by reference); however, current methods of producing such nanorods are difficult and expensive.

The idea of preparing titanium oxide having a particular morphology is not a new concept. The traditional approach to obtaining titanium oxide having a desired morphology has been to precipitate the titanium oxide onto a template having the desired shape (see, for example, Imhof, Langmuir, 17:3579-85 (2001), and Li et al., Langmuir, 24(19): 10552-6 (2008), which are incorporated herein by reference). Polymers are one of the most widely used types of materials used as a template. This is largely due to their controllable size and shape, straightforward chemical modification, and ease of removal with heat or solvent after precipitation. Poly(methylmethacrylate) (PMMA) and poly(styrene) are two polymers that have commonly been used as templates and have been used to create titanium oxides of certain shapes, such as core/shell composites, hollow shells, tubes, and 3-D porous structures. Most of the methods for titanium oxide formation that use a template involve a sol-gel procedure, in which, after precipitation, the template is removed using heat or a harsh solvent.

More exotic morphologies than those obtainable using the aforementioned polymeric templates occur naturally in nature, and there have been some gas and solution phase studies to determine the feasibility of using these biomaterials for templating. For example, diatoms are unicellular organisms that create thousands of different 3-D morphologies of silicon oxide in their exoskeletons for environmental protection (see, for example, Cha et al., Nature, 403:289-292 (2000), and Sumper et al., J. Mater. Chem., 14:2059-65 (2004), which are incorporated herein by reference). The exoskeletons of these organisms can be modified using gas/solid displacement to incorporate other atoms in place of silicon in their structures. This approach preserves the integrity of the exoskeleton morphology, which can then be integrated into electronic devices. As another example, sea urchin plates have been coated with silicon oxide and titanium oxide using a sol-gel method, in which the template can thereafter be dissolved away with a strong acid. As yet another example, zinc oxide has been shaped using butterfly wings as a template (see, for example, Zhang et al., Bioinsp. Biomim., 1:89-95 (2006), which is incorporated herein by reference). The wing is dipped into an ethanol/water solution of zinc nitrate and treated with high temperature to form a zinc oxide "wing." The actual butterfly wing is then ashed with heat, leaving the "duplicate" zinc oxide wing. Although the above-described use of biological templates enables certain morphologies not otherwise attainable to be achieved, these approaches are still limited by the available shapes of the biological template, as well as being limited by long-term commercial applicability. Finally, all of the above approaches are limited in the sense that they cannot also concurrently incorporate environmentally sensitive materials during oxide formation, due to the heat and/or harsh solvent typically used during the process. This drawback further limits their potential multifunctionality.

Recent mechanistic studies on naturally occurring biomolecules, such as silaffin (peptide) and silicatein (enzyme), have led to novel biomimetic approaches to inorganic oxide formation. The initiating materials for these studies were chosen in order to mimic the active components of the natural biomolecules. These methods have mostly utilized either a small molecule or a polymer containing hydroxyl and/or amine side chains to initiate precipitation of different oxides from solution (see, for example, Sewell et al., Chem. Mater., 18:3108-13 (2006), and Gorna et al., Macromol. Biosci., 7(2):163-73 (2007), which are incorporated herein by reference). Most of these studies only report on whether the material has the ability to precipitate the oxide, without a discussion of morphological control. No system to-date has demonstrated an ability to create multiple different morphologies without changes in reaction conditions, such as reaction temperature, buffer composition and pH.

SUMMARY OF THE INVENTION

It is an object of the present invention to provide a method for preparing titanium oxide precipitates of desired morphologies.

It is another object of the present invention to provide a method as described above that overcomes at least some of the shortcomings discussed above in connection with existing techniques.

Therefore, according to one aspect of the invention, there is provided a method of preparing a titanium oxide precipitate having a defined morphology, said method comprising the steps of (a) providing a peptide, said peptide consisting of 5-20 amino acid residues, wherein said peptide consists of a mixture of cationic amino acid residues and hydrophilic amino acid residues; (b) providing an aqueous solution comprising a titanium oxide precursor; and (c) combining said peptide and said aqueous solution comprising said titanium oxide precursor, whereby titanium oxide precipitates with a defined morphology.

The aforementioned titanium oxide precursor may be titanium(IV) bis(ammonium lactate) dihydroxide. The aforementioned peptide may consist of a mixture of cationic amino acid residues and hydrophilic amino acid residues in a cationic:hydrophilic residue ratio of ≥1:1, respectively. More specifically, the cationic amino acid residues may be lysine residues and/or arginine residues, and the hydrophilic amino acid residues may be serine residues. To yield a more porous precipitate, the serine residues may be adjacent to one another or may be separated by a single amino acid residue. On the other hand, to yield a more particulate precipitate, the serine residues may be separated by a plurality of amino acid residues.

According to another aspect of the invention, there is provided a method of preparing a titanium oxide precipitate having a defined morphology, said method comprising the steps of (a) providing a peptide solution, said peptide solution comprising a peptide consisting of 5-20 amino acid residues, wherein said peptide consists of a mixture of cationic amino acid residues and hydrophilic amino acid residues; (b) providing an aqueous solution comprising a titanium oxide precursor; (c) providing a buffer solution; and (d) combining said peptide solution, said buffer solution, and said aqueous solution comprising said titanium oxide precursor, whereby titanium oxide precipitates with a defined morphology.

The aforementioned titanium oxide precursor may be titanium(IV) bis(ammonium lactate) dihydroxide. The aforementioned peptide may consist of a mixture of cationic amino acid residues and hydrophilic amino acid residues in a cationic:hydrophilic residue ratio of ≥1:1, respectively. More specifically, the cationic amino acid residues may be lysine residues and/or arginine residues, and the hydrophilic amino acid residues may be serine residues. To yield a more porous precipitate, the serine residues may be adjacent to one another or may be separated by a single amino acid residue. On the other hand, to yield a more particulate precipitate, the serine residues may be separated by a plurality of amino acid residues.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF THE INVENTION

Figure 1:
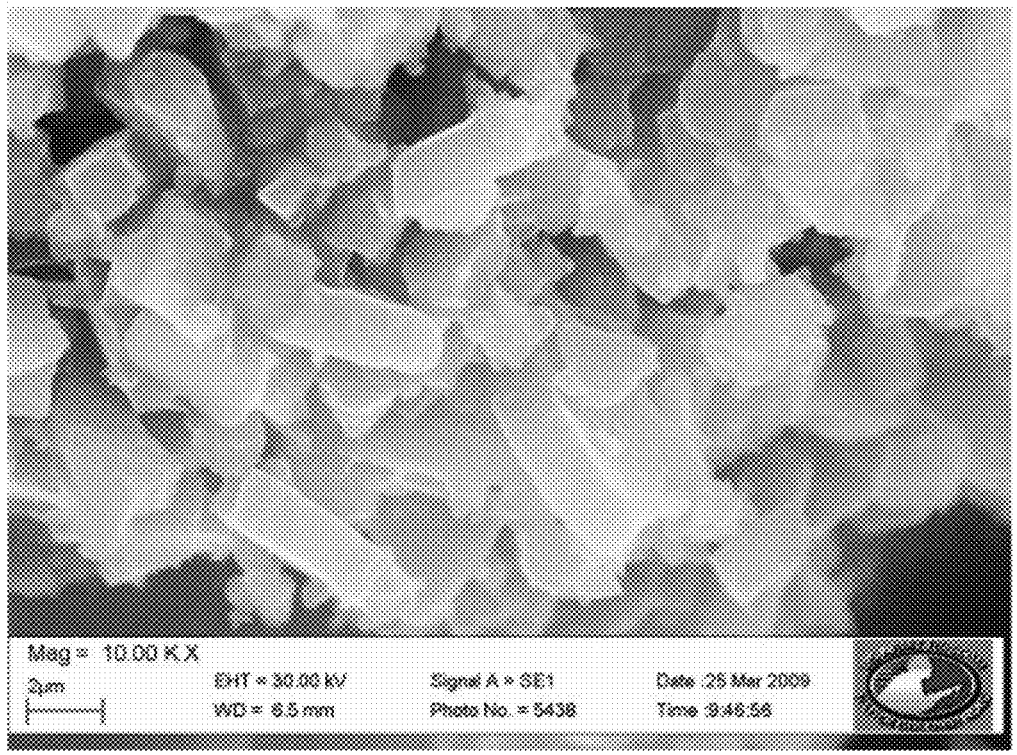
FIG. 1 is a scanning electron microscope (SEM) image of a titanium oxide precipitate of rectangular shape prepared according to the method discussed in Example 1 below.

The present invention is directed at a method of preparing titanium oxide precipitates with defined morphologies. More specifically, the present method involves using peptides not only to facilitate the biomimetic precipitation of titanium oxide but also to control the specific morphologies of the resulting precipitates. According to one embodiment, the peptides are 5-20 amino acids in length and are used as initiators to cause the precipitation of titanium oxide from a buffered aqueous solution containing a titanium oxide precursor, such as, but not limited to, titanium(IV) bis(ammonium lactate) dihydroxide.

The peptides consist of amino acids that are hydrophilic at neutral pH, such as serine, and amino acids that are cationic at neutral pH, such as lysine and arginine. The sequences of the peptides are designed to induce the formation of specific morphologies including, but not limited to, spheres, rectangular blocks, cubes, porous sheets, non-porous sheets, and flowers. These morphologies are derived directly from the interactions of the designed peptides with both the titanium oxide precursor and the growing oxide. As such, there is no need for a morphology "template" using these peptides. The present method enables the formation of distinct and consistent titanium oxide morphologies without a need for high temperatures and pressures or for caustic reaction conditions. Consequently, the present method allows for titanium oxide formation in the presence of environmentally sensitive materials, thereby enabling such sensitive materials to be incorporated into the titanium oxide structure. In addition, because the present method does not require caustic reaction conditions, the present method limits hazardous waste streams.

As noted above, the peptide sequences of the present invention consist of a combination of hydrophilic amino acid residues and cationic amino acid residues, which together direct control over morphology. The cationic residues, such as lysine and arginine, act primarily as nucleators for titanium oxide growth whereas the hydrophilic residues, such as serine, are instrumental in defining the titanium oxide morphology as it forms. Using biomimetic reaction conditions, different sequence-specific titanium oxide morphologies can be reproducibly created, simply by using a different designed peptide.

The peptides are designed to be 5-20 amino acid residues in length, with a cationic:hydrophilic residue ratio of >1:1, to adequately induce nucleation while maintaining morphological control. Placement of the non-ionic hydrophilic residues within the peptide structure is crucial to the resulting morphology as the non-ionic hydrophilic residues provide regions of slow oxide growth. Careful design of these peptides has produced distinct morphologies, such as spheres, rectangles, porous structures, and flat disks, without the assistance of seed particles or templates.

The titanium oxide reactions are preferably performed at room temperature and atmospheric pressure and at a neutral pH in a buffered aqueous solution. This may be achieved, for example, by adding water soluble, titanium oxide precursors to a buffered solution containing the peptide and allowing the reaction to proceed for several hours. After the reaction is complete, the precipitates are washed with buffer and then with water to remove excess salts. Upon drying, the precipitates may be examined, such as with Scanning Electron Microscopy (SEM), to determine the morphology produced. It has been found that, as soon as within 10 minutes of the addition of the precursor, distinct morphologies are evident from SEM. Further, oxide growth continues to occur throughout the reaction, creating larger structures that maintain the same morphology.

Without wishing to be limited to any particular theory of the invention, the following guidelines may be used in designing specific peptide sequences to achieve a desired morphology of titanium oxide prepared in the above-described manner: First, the amine and/or guanidine side chains on the lysine and arginine residues, respectively, appear to be the primary elements for the nucleation of titania. Second, although the lysine and arginine residues seem to initiate nucleation, the hydroxyl side chains associated with serine appear to provide control of titania morphology. The serine residues seemingly affect this control by hindering the steric and electrostatic repulsion effects of the lysine or arginine side chains. This is supported by Molecular Dynamics simulations, which demonstrate that aggregation of these peptides occurs through interactions between the side chains on the serine residues. Third, the hindering effect associated with serine appears to be enhanced when two serine residues are adjacent to each other or are separated by a single amino acid. Fourth, the hydrophilic/cationic primary structure organization and ratio appears to affect the overall morphology of titania. Fifth, the minimum peptide composition that can precipitate titania appears to be five lysines or a combination of three lysines and two serines. For example, the peptide KSSKK (SEQ ID NO: 1) is capable not only of precipitating titania but also yields a very distinct morphology for the precipitate. Sixth, the peptide sequences seem to be very specific for particular morphologies, with slight changes to sequence affecting the resulting morphology. In fact, even a single amino acid addition at any position in the sequence may profoundly affect the resulting morphology. Seventh, the morphology of the precipitate seems to be apparent within 10 min of initiation of the reaction.

It should be noted that primary structure alone does not fully explain the ability of the peptides of the present invention to control morphology, and it is believed that secondary structure also has some role in morphology control. To gain a greater understanding of this, 10 peptide sequences were chosen to be used in computer modeling and experimental studies: KSSKK (SEQ ID NO: 1), SKSKKKSKSKKK (SEQ ID NO: 2), SKKKKKKKKKS (SEQ ID NO: 3), SSKKKKKKKKKK (SEQ ID NO: 4), SKSKKKKKKKK (SEQ ID NO: 5), SKKKKSSKKKKS (SEQ ID NO: 6), KKKSKSKKK (SEQ ID NO: 7), SKKKKKSKKKK (SEQ ID NO: 8), SKKKKKSKKKKK (SEQ ID NO: 9), and SKKSKKKKKKK (SEQ ID NO: 10). These peptides were chosen, in part, because they are representative examples of sequences that produced distinct morphologies.

The computer models of these peptides reveal two important characteristics to be examined by experimental data. First, they suggest that there is some secondary structure in these small peptides. Second, the computer models demonstrate that these peptides form aggregates with themselves. Both of these factors play a role in morphological control. As suggested by the computer models, initial circular dichroism (CD) studies confirm that the peptides do have some secondary structure.

The rules that are outlined above can be used to select for a set of peptides that yield a specific morphology. For example, fused particles of titania are frequently used in photovoltaic cells. Using a particle instead of a coating increases the surface area for greater electron collection. However, the particles need to be connected so that electrons can move through individual particles to the collection site. To precipitate fused particles of titania using a peptide, it is possible to design a few peptides for testing using the above rules. For example, it is known that the peptide needs to be at least five amino acid residues in length for precipitation of titania to occur. Similarly, the peptide must consist of a combination of lysine/arginine and serine at a ratio greater than 1:1 (lysine/arginine:serine). In general, porous precipitates more frequently occur using peptides in which the serines are adjacent to each other or are separated by a single lysine. By contrast, a more particulate precipitate is observed when the serines are separated by more than one lysine/arginine residue and preferably by as many as five or six lysine/arginine residues. Therefore, peptides that are 5-20 amino acid residues long with serine residues separated by three or four lysine residues would be good design parameters to consider.

Examples of peptides that may be used in accordance with the teachings of the present invention to prepare titanium oxide precipitates having a flat, fused-disk morphology include, but are not limited to, the following: SKKKKSSKKKKS (SEQ ID NO: 6), KKKSKSKKK (SEQ ID NO: 7), RRRSSRRRSSRRR (SEQ ID NO: 11), SKSKKKSKSKKKSKS (SEQ ID NO: 12), and SSKKKSSKKK (SEQ ID NO: 13).

An example of a peptide that may be used in accordance with the teachings of the present invention to prepare titanium oxide precipitates having a rectangular morphology includes, but is not limited to, KSSKK (SEQ ID NO: 1).

Examples of peptides that may be used in accordance with the teachings of the present invention to prepare titanium oxide precipitates having a spherical morphology include, but are not limited to, the following: SKSKKKSKSKKK (SEQ ID NO: 2), SKKKKKKKKKS (SEQ ID NO: 3), RRSSSRRSSSRR (SEQ ID NO: 14), RRRSRRRSRRRSRRR (SEQ ID NO: 15), and SKKSKKK (SEQ ID NO: 16).

Examples of peptides that may be used in accordance with the teachings of the present invention to prepare titanium oxide precipitates having a porous morphology include, but are not limited to, the following: SKKKKKSKKKK (SEQ ID NO: 8), KKSSKKKKKKKKKS (SEQ ID NO: 17), KKKKSSKKKK (SEQ ID NO. 18), SKKSKKKKKKKK (SEQ ID NO: 19), and SKKKSKKKK (SEQ ID NO: 20).

A standard reaction for precipitating titanium oxide combines about 15 µL at of a peptide stock solution (100 g/L), 45 µL of buffer solution (it will be understood that a concentration in a range from about 25 mM to about 200 mM may be employed, pH adjusted to about 7.20), and about 15 µL of Titanium(IV) bis(ammonium lactato)dihydroxide (TBALD). The reaction mixture is covered and shaken for 24 hours at room temperature. The precipitates are collected by centrifugation at 3,000 rpm for 10 minutes. The supernatant is removed, the precipitates are washed with 50 µL of Milli-Q® reagent grade water (Millipore Corporation, Billerica, Mass.) and re-pelleted, and the pellet is re-suspended in 50 µL Milli-Q® water. This wash cycle is repeated a total of four times. The samples are left partially covered to air dry for 24 hours.

The following examples are illustrative only and do not in any way limit the present invention:

EXAMPLE 1

The peptide KSSKK (SEQ ID NO: 1) was dissolved in 25 mM buffer, pH adjusted to 7.2, to a concentration of 100 mg/mL. The peptide solution was then allowed to sit for at least 30 minutes so as to give the peptide time to reach conformational equilibrium and to aggregate. Next, 15 μL of the aforementioned peptide solution was mixed together with 45 μL of the same buffer, and 15 μL of titanium(IV) bis (ammonium lactato)dihydroxide (TBALD) was then added to the mixture. The mixture was then covered and shaken for 24 hours at room temperature. The reaction vessels were then centrifuged at 3000 rpm for 10 minutes. After supernatant removal, the precipitates were washed with 50 μL of Milli-Q® water. The aforementioned wash procedure was then repeated 4 times, and the precipitates were then allowed to air-dry overnight. FIG. 1 shows an SEM image of the resulting precipitate. As can be seen, the precipitate has a rectangular morphology.

EXAMPLE 2

Figure 2:
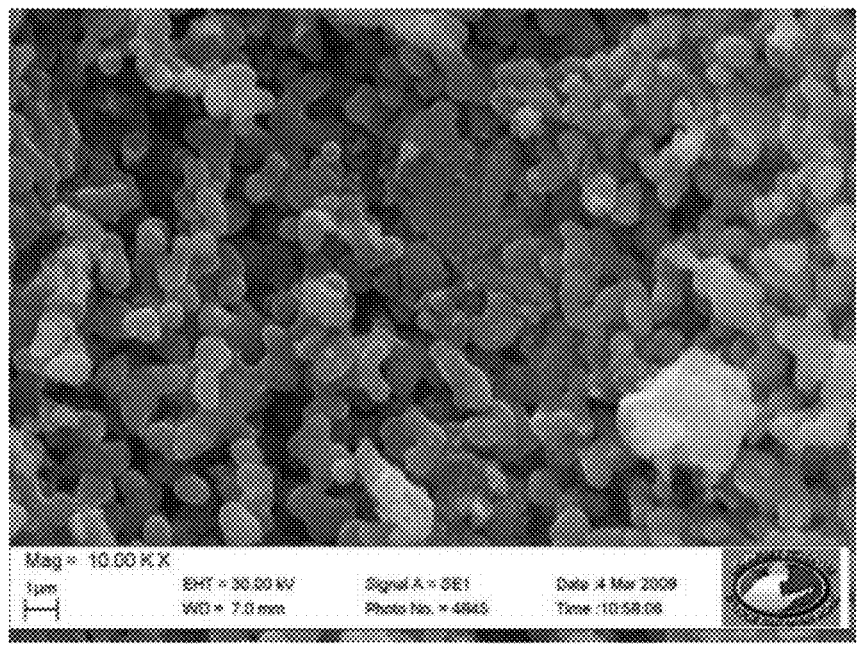
FIG. 2 is an SEM image of a titanium oxide precipitate having a flat, fused-disk shape prepared according to the method discussed in Example 2 below.

The peptide SKKKKSSKKKKS (SEQ ID NO: 6) was dissolved in 25 mM buffer, pH adjusted to 7.2, to a concentration of 100 mg/mL. The peptide solution was then allowed to sit for at least 30 minutes so as to give the peptide time to reach conformational equilibrium and to aggregate. Next, 15 μL of the aforementioned peptide solution was mixed together with 45 μL of the same buffer, and 15 μL of titanium (IV) bis(ammonium lactato)dihydroxide (TBALD) was then added to the mixture. The mixture was then covered and shaken for 24 hours at room temperature. The reaction vessels were then centrifuged at 3000 rpm for 10 minutes. After supernatant removal, the precipitates were washed with 50 μL of Milli-Q® water. The aforementioned wash procedure was then repeated 4 times, and the precipitates were then allowed to air-dry overnight. FIG. 2 shows an SEM image of the resulting precipitate. As can be seen, the precipitate has a flat, fused-disk morphology.

EXAMPLE 3

Figure 3:
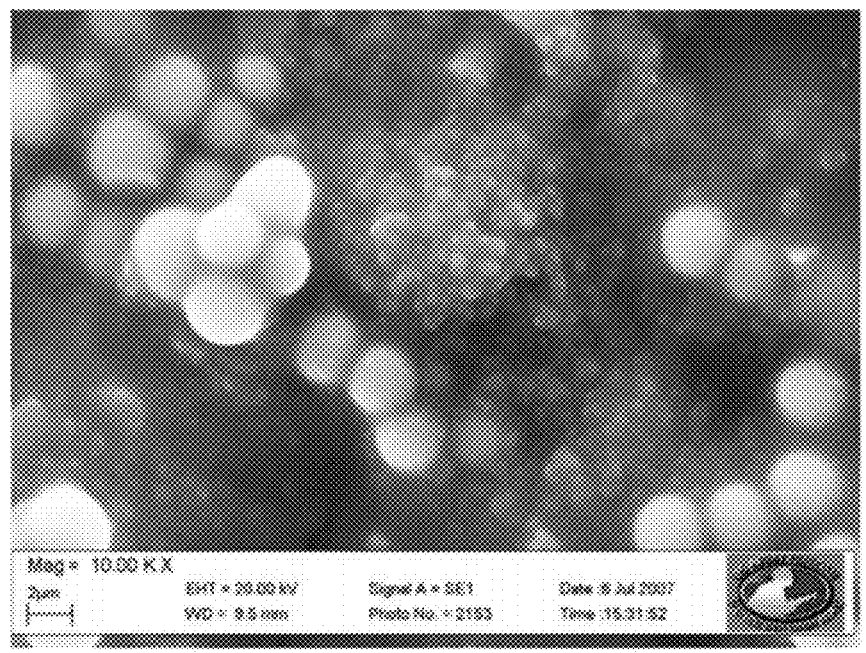
FIG. 3 is an SEM image of a titanium oxide precipitate of spherical shape prepared according to the method discussed in Example 3 below.

The peptide RRSSSRRSSSRR (SEQ ID NO: 14) was dissolved in 25 mM buffer, pH adjusted to 7.2, to a concentration of 100 mg/mL. The peptide solution was then allowed to sit for at least 30 minutes so as to give the peptide time to reach conformational equilibrium and to aggregate. Next, 15 μL of the aforementioned peptide solution was mixed together with 45 μL of the same buffer, and 15 μL of titanium(IV) bis (ammonium lactato)dihydroxide (TBALD) was then added to the mixture. The mixture was then covered and shaken for 24 hours at room temperature. The reaction vessels were then centrifuged at 3000 rpm for 10 minutes. After supernatant removal, the precipitates were washed with 50 μL of Milli-Q® water. The aforementioned wash procedure was then repeated 4 times, and the precipitates were then allowed to air-dry overnight. FIG. 3 shows an SEM image of the resulting precipitate. As can be seen, the precipitate has a spherical morphology.

EXAMPLE 4

Figure 4:
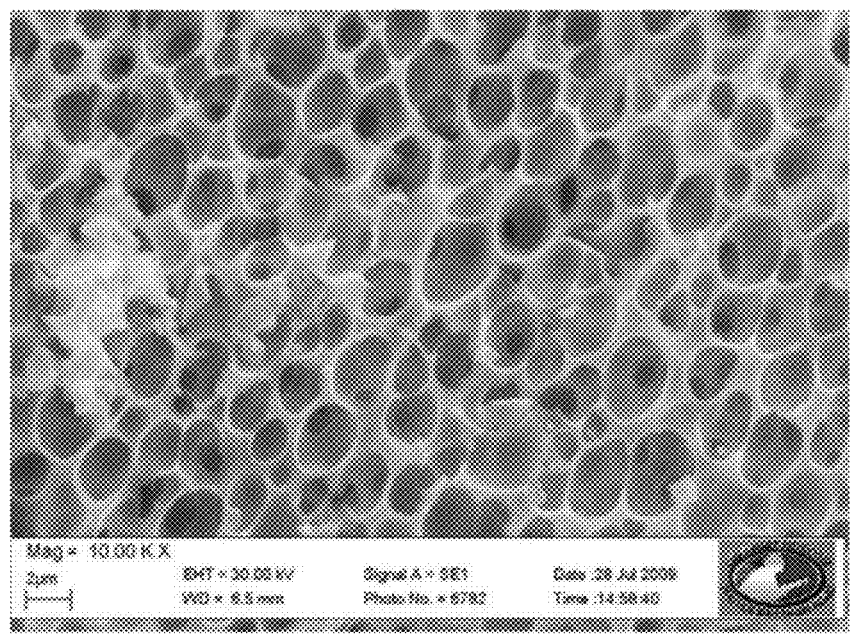
FIG. 4 is an SEM image of a porous titanium oxide precipitate prepared according to the method discussed in Example 4 below.

The peptide SKKKKKSKKKK (SEQ ID NO: 8) was dissolved in 25 mM buffer, pH adjusted to 7.2, to a concentration of 100 mg/mL. The peptide solution was then allowed to sit for at least 30 minutes so as to give the peptide time to reach conformational equilibrium and to aggregate. Next, 15 μL of the aforementioned peptide solution was mixed together with 45 μL of the same buffer, and 15 μL of titanium(IV) bis (ammonium lactato)dihydroxide (TBALD) was then added to the mixture. The mixture was then covered and shaken for 24 hours at room temperature. The reaction vessels were then centrifuged at 3000 rpm for 10 minutes. After supernatant removal, the precipitates were washed with 50 μL of Milli-Q® water. The aforementioned wash procedure was then repeated 4 times, and the precipitates were then allowed to air-dry overnight. FIG. 4 shows an SEM image of the resulting precipitate. As can be seen, the precipitate has a porous morphology.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

---

What is claimed is:

1. A method of preparing a titanium oxide precipitate having a defined morphology, said method comprising the steps of:
   (a) providing a peptide, said peptide consisting of 5-20 amino acid residues, wherein said peptide consists of a mixture of amino acid residues that are cationic at neutral pH and amino acid residues that are hydrophilic at neutral pH;
   (b) providing an aqueous solution comprising a titanium oxide precursor; and
   (c) combining said peptide and said aqueous solution comprising said titanium oxide precursor, whereby titanium oxide precipitates with a defined morphology;
   wherein said peptide is selected from the group consisting of KSSKK (SEQ ID NO: 1), SKSKKKSKSKKK (SEQ ID NO: 2), SKKKKKKKKKS (SEQ ID NO: 3), SSKKKKKKKKK (SEQ ID NO: 4), SKSKKKKKKKK (SEQ ID NO: 5), SKKKKSSKKKKS (SEQ ID NO: 6), KKKSKSKKK (SEQ ID NO: 7), SKKKKKSKKKK (SEQ ID NO: 8), SKKKKKSKKKKK (SEQ ID NO: 9), SKKSKKKKKKK (SEQ ID NO: 10), RRRSSRRRSSRRR (SEQ ID NO: 11), SKSKKKSKSKKKSKS (SEQ ID NO: 12), SSKKKSSKKK (SEQ ID NO: 13), RRSSSRRSSSRR (SEQ ID NO: 14), RRRSRRRSRRRSRRR (SEQ ID NO: 15), SKKSKKK (SEQ ID NO: 16), KKSSKKKKKKKKKS (SEQ ID NO: 17), KKKKSSKKKK (SEQ ID NO. 18), SKKSKKKKKKKK (SEQ ID NO: 19), and SKKKSKKKK (SEQ ID NO: 20).

2. The method as claimed in claim 1 wherein said titanium oxide is titanium(IV) bis(ammonium lactate) dihydroxide.

3. The method as claimed in claim 1 wherein said peptide consists of a mixture of cationic amino acid residues and hydrophilic amino acid residues in a cationic:hydrophilic residue ratio ≥1:1, of respectively.

4. The method as claimed in claim 3 wherein said cationic amino acid residues are selected from the group consisting of at least one of lysine residues and arginine residues.

5. The method as claimed in claim 4 wherein said cationic amino acid residues are lysine residues.

6. The method as claimed in claim 4 wherein said cationic amino acid residues are arginine residues.

7. The method as claimed in claim 3 wherein said hydrophilic amino acid residues are serine residues.

8. The method as claimed in claim 3 wherein said cationic amino acid residues are at least one of lysine residues and arginine residues and wherein said hydrophilic amino acid residues are serine residues.

9. The method as claimed in claim 3 wherein two hydrophilic amino acid residues are adjacent to one another.

10. The method as claimed in claim 3 wherein two hydrophilic amino acid residues are separated by a single cationic amino acid residue.

11. The method as claimed in claim 3 wherein two hydrophilic amino acid residues are separated by a plurality of cationic amino acid residues.

12. The method as claimed in claim 1 wherein said peptide is KSSKK (SEQ ID NO: 1).

13. The method as claimed in claim 1 wherein said peptide is selected from the group consisting of SKKKKSSKKKKS (SEQ ID NO: 6), KKKSKSKKK (SEQ ID NO: 7), RRRSSRRRSSRRR (SEQ ID NO: 11), SKSKKKSKSKKKSKS (SEQ ID NO: 12), and SSKKKSSKKK (SEQ ID NO: 13).

14. The method as claimed in claim 1 wherein said peptide is selected from the group consisting of SKSKKKSKSKKK (SEQ ID NO: 2), SKKKKKKKKKS (SEQ ID NO: 3), RRSSSRRSSSRR (SEQ ID NO: 14), RRRSRRRSRRRSRRR (SEQ ID NO: 15), and SKKSKKK (SEQ ID NO: 16).

15. The method as claimed in claim 1 wherein said peptide is selected from the group consisting of SKKKKKSKKKK (SEQ ID NO: 8), KKSSKKKKKKKKKS (SEQ ID NO: 17), KKKKSSKKKK (SEQ ID NO. 18), SKKSKKKKKKKK (SEQ ID NO: 19), and SKKKSKKKK (SEQ ID NO: 20).

16. A method of preparing a titanium oxide precipitate having a defined morphology, said method comprising the steps of:
   (a) providing a peptide solution, said peptide solution comprising a peptide consisting of 5-20 amino acid residues, wherein said peptide consists of a mixture of amino acid residues that are cationic at neutral pH and amino acid residues that are hydrophilic at neutral pH;
   (b) providing an aqueous solution comprising a titanium oxide precursor;
   (c) providing a buffer solution; and
   (d) combining said peptide solution, said buffer solution, and said aqueous solution comprising said titanium oxide precursor, whereby titanium oxide precipitates with a defined morphology wherein said peptide is selected from the group consisting of KSSKK (SEQ ID NO: 1), SKSKKKSKSKKK (SEQ ID NO: 2), SKKKKKKKKKS (SEQ ID NO: 3), SSKKKKKKKKK (SEQ ID NO: 4), SKSKKKKKKKK (SEQ ID NO: 5), SKKKKSSKKKKS (SEQ ID NO: 6), KKKSKSKKK (SEQ ID NO: 7), SKKKKKSKKKK (SEQ ID NO: 8), SKKKKKSKKKKK (SEQ ID NO: 9), SKKSKKKKKKK (SEQ ID NO: 10), RRRSSRRRSSRRR (SEQ ID NO: 11), SKSKKKSKSKKKSKS (SEQ ID NO: 12), SSKKKSSKKK (SEQ ID NO: 13), RRSSSRRSSSRR (SEQ ID NO: 14), RRRSRRRSRRRSRRR (SEQ ID NO: 15), SKKSKKK (SEQ ID NO: 16), KKSSKKKKKKKKKS (SEQ ID NO: 17), KKKKSSKKKK (SEQ ID NO. 18), SKKSKKKKKKKK (SEQ ID NO: 19), and SKKKSKKKK (SEQ ID NO: 20).

17. The method as claimed in claim 16 wherein said titanium oxide precursor is titanium(IV) bis(ammonium lactate) dihydroxide.

18. The method as claimed in claim 16 wherein said peptide consists of a mixture of cationic amino acid residues and hydrophilic amino acid residues in a cationic:hydrophilic residue ratio of >1:1, respectively.

19. The method as claimed in claim 18 wherein said cationic amino acid residues are selected from the group consisting of at least one of lysine residues and arginine residues and wherein the hydrophilic amino acid residues are serine residues.

20. The method as claimed in claim 16 wherein said peptide is KSSKK (SEQ ID NO: 1).

21. The method as claimed in claim 16 wherein said peptide is selected from the group consisting of SKKKKSSKKKKS (SEQ ID NO: 6), KKKSKSKKK (SEQ ID NO: 7), RRRSSRRRSSRRR (SEQ ID NO: 11), SKSKKKSKSKKKSKS (SEQ ID NO: 12), and SSKKKSSKKK (SEQ ID NO: 13).

22. The method as claimed in claim 16 wherein said peptide is selected from the group consisting of SKSKKKSKSKKK (SEQ ID NO: 2), SKKKKKKKKKS (SEQ ID NO: 3), RRSSSRRSSSRR (SEQ ID NO: 14), RRRSRRRSRRRSRRR (SEQ ID NO: 15), and SKKSKKK (SEQ ID NO: 16).

23. The method as claimed in claim 16 wherein said peptide is selected from the group consisting of SKKKKKSKKKK (SEQ ID NO: 8), KKSSKKKKKKKKKS (SEQ ID NO: 17), KKKKSSKKKK (SEQ ID NO. 18), SKKSKKKKKKKK (SEQ ID NO: 19), and SKKKSKKKK (SEQ ID NO: 20).

24. The method as claimed in claim 16 wherein said buffer solution ranges from about 25 mM to about 200 mM.

\* \* \* \* \*